(No Model.) 4 Sheets—Sheet 2.
C. HEISLER.
ALTERNATING CURRENT DYNAMO ELECTRIC MACHINE.
No. 380,115. Patented Mar. 27, 1888.
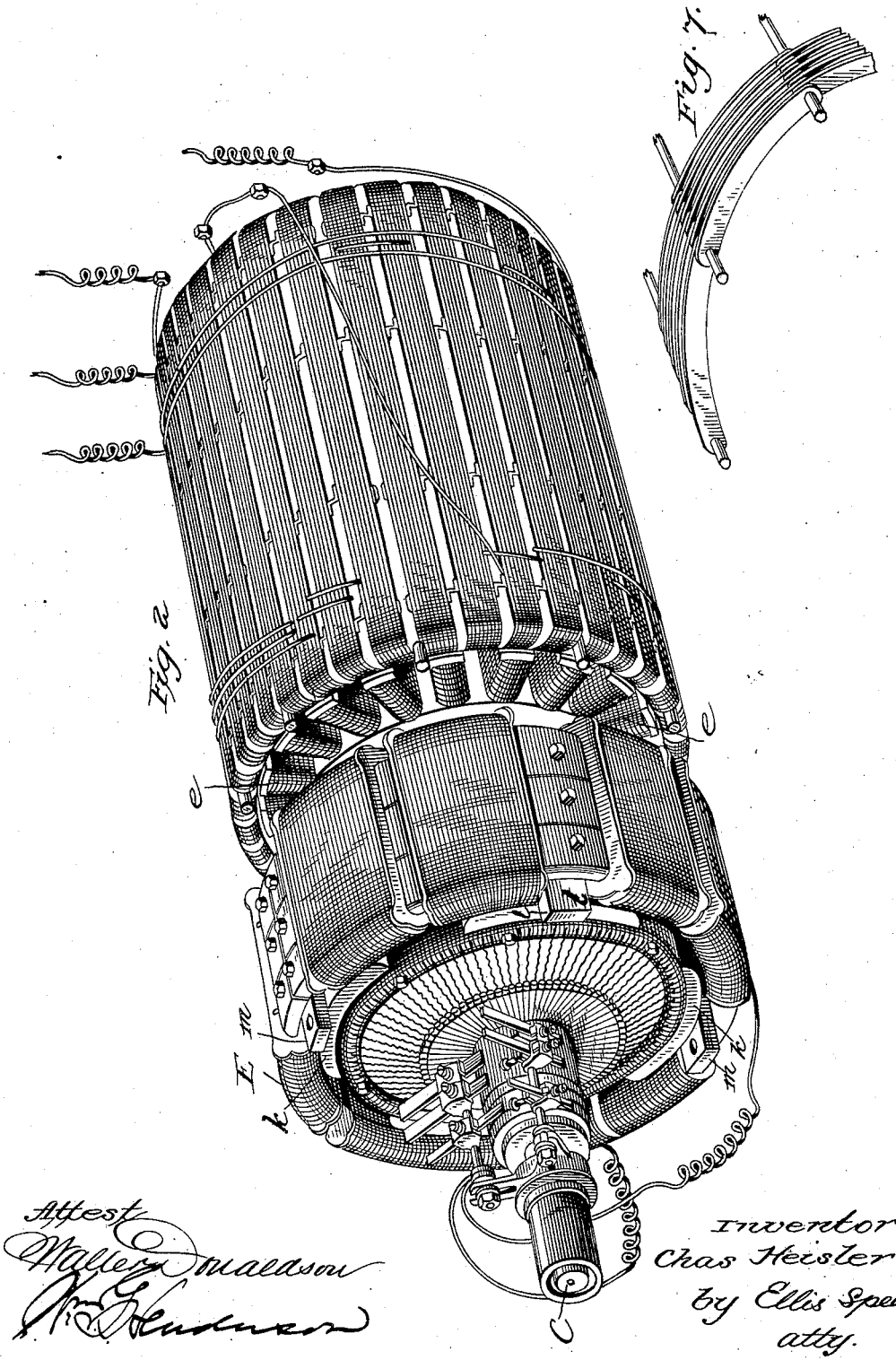

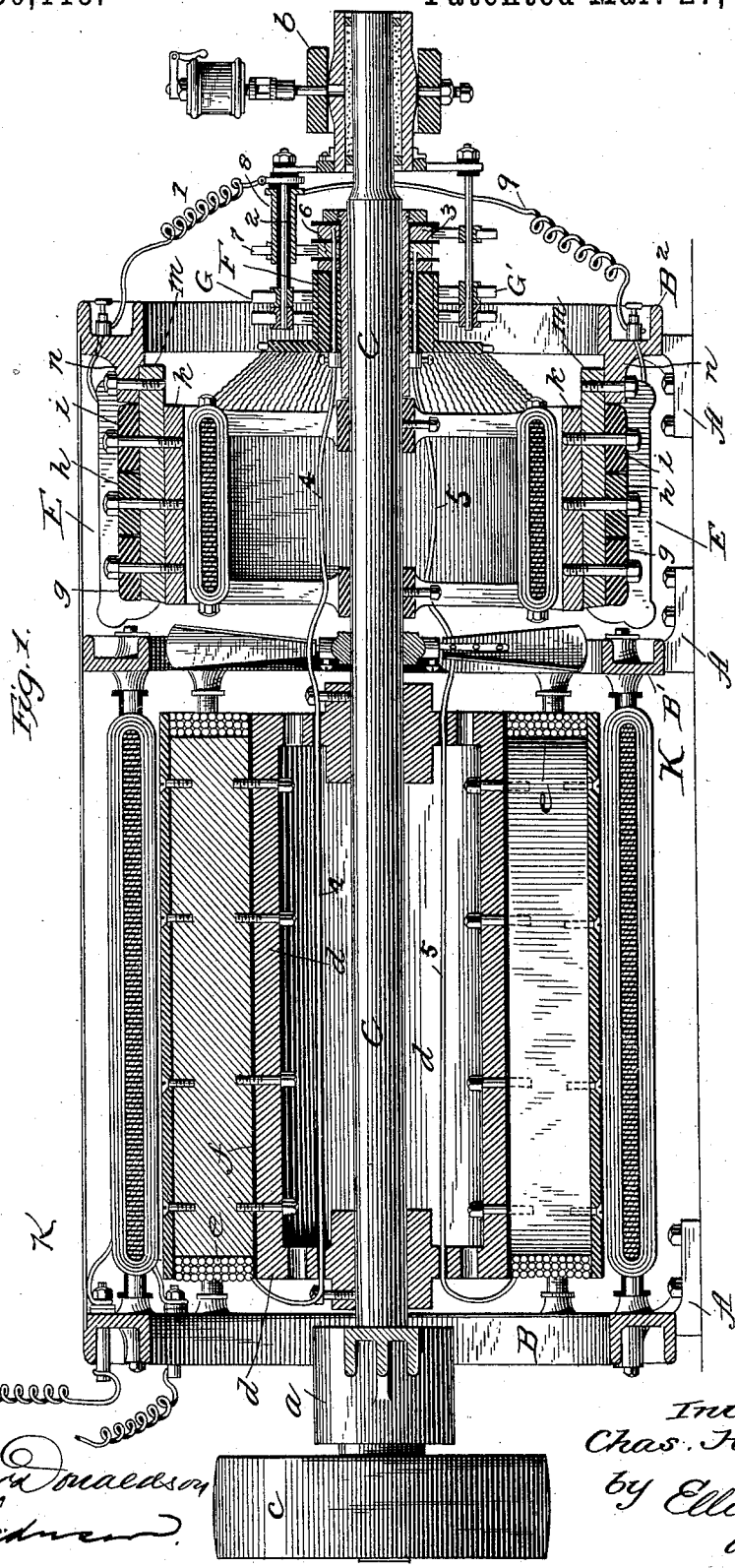

(No Model.) 4 Sheets—Sheet 3.
C. HEISLER.
ALTERNATING CURRENT DYNAMO ELECTRIC MACHINE.
No. 380,115. Patented Mar. 27, 1888.
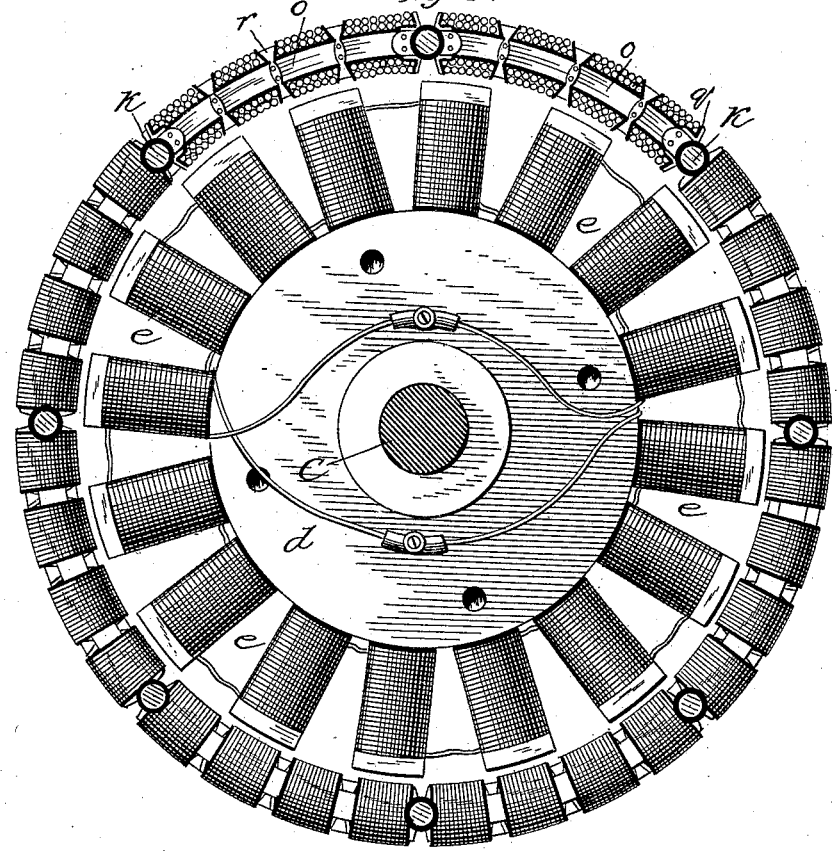
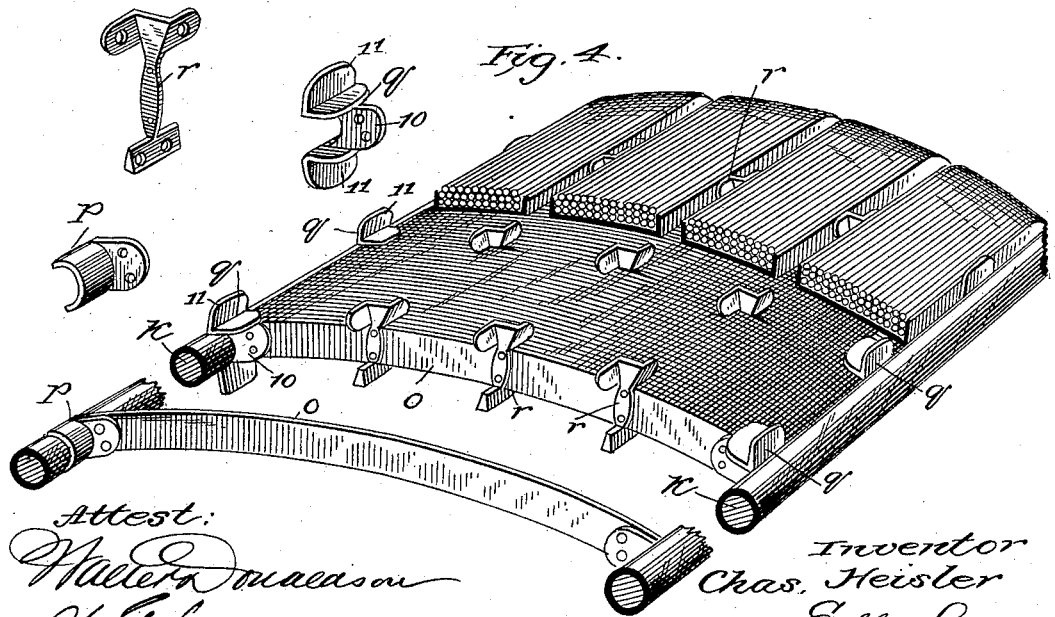

(No Model.) 4 Sheets—Sheet 4.

C. HEISLER.
ALTERNATING CURRENT DYNAMO ELECTRIC MACHINE.

No. 380,115. Patented Mar. 27, 1888.

Attest
Miller Donaldson
F. L. Middleton.

Inventor,
Charles Heisler,
by Ellis Spear
Atty.

UNITED STATES PATENT OFFICE.

CHARLES HEISLER, OF ST. LOUIS, MISSOURI.

ALTERNATING-CURRENT DYNAMO-ELECTRIC MACHINE.

SPECIFICATION forming part of Letters Patent No. 380,115, dated March 27, 1888.

Application filed May 25, 1887. Serial No. 239,336. (No model.)

*To all whom it may concern:*

Be it known that I, CHARLES HEISLER, of St. Louis, in the State of Missouri, have invented a new and useful Improvement in Dynamo-Machines; and I do hereby declare that the following is a full, clear, and exact description of the same.

My invention relates to dynamo-electric machines of the class designed to furnish alternating currents.

The invention consists in the novel construction and arrangement of the devices and combination of devices which go to make up my improved machine.

Figure 5:
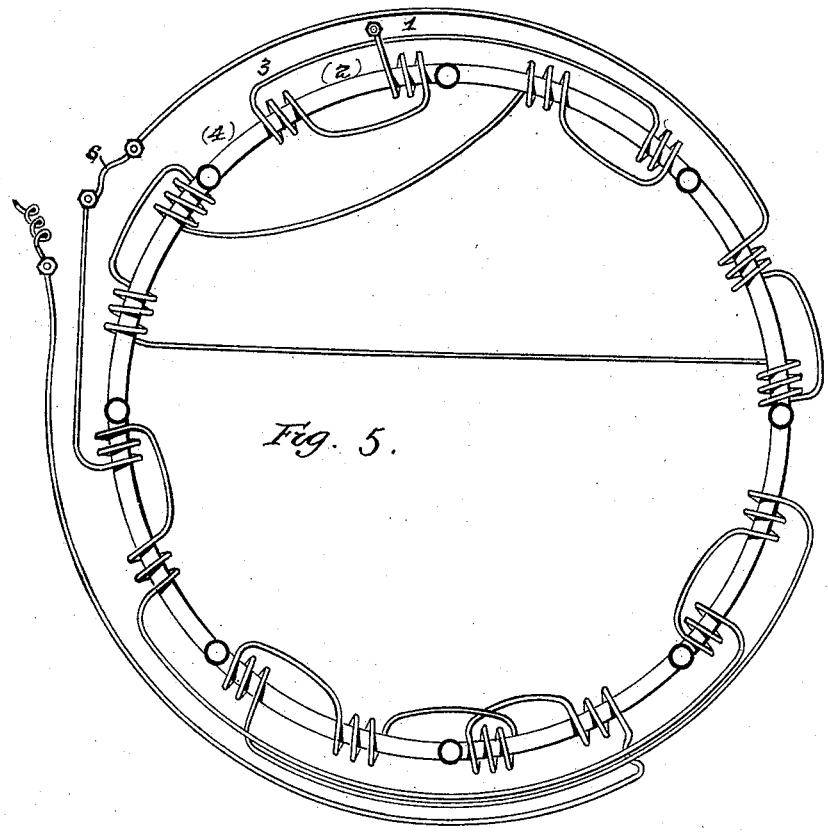
Figure 6:
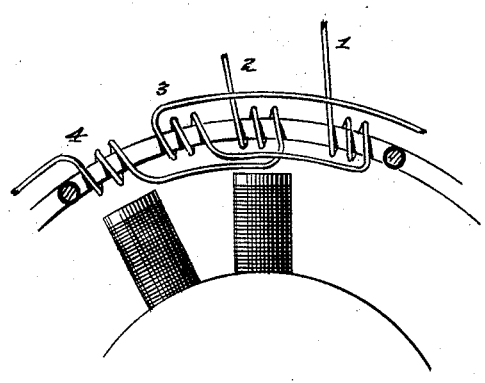

In the accompanying drawings, which fully and particularly illustrate my invention, Figure 1 represents a vertical longitudinal central section of my machine. Fig. 2 is a perspective view of the interior with the inclosing-shell removed. Fig. 3 is an end elevation of the field-magnets and armature, with some of the armature-coils in section. Fig. 4 is a perspective view of an armature-section with the insulated supports, the supports for the sections, and the clips for supporting and staying the wires of the coil. Fig. 5 is a diagram showing the armature-core with one set of coils wound thereon, the spaces between being provided for the coils of the other set. Fig. 6 is a section of the armature-core, showing the relative arrangement of a portion of the coils of two circuits, it being understood that the arrangement of the coils upon the other section of the core is precisely the same. Fig. 7 illustrates the arrangement of the sheet-metal strips composing the armature of the exciting-generator.

The invention includes a stationary armature, revolving field-magnets, and an exciting-generator for the field-magnets, supplying a continuous current thereto, the stationary armature being composed of sections wound to produce alternating currents adapted to furnish the working-circuits without the use of a commutator.

In the drawings, A A A represent the base-plates of the machine, which support the frame, consisting of the end and intermediate rings or standards, B B' B², and the rods extending between them.

A yoke, $a$, supports the main driving-shaft C at one end of the frame, and the extreme opposite end of the shaft is supported in a bracket, $b$, provided with the necessary lubricating attachment. The ordinary belt-wheel for communicating power to the shaft is shown at $c$. On the shaft between the rings B B', I mount the field-magnets, forming part of the main generator, this field-magnet consisting of the cylindrical section $d$ and the magnets $e$. The section $d$ is provided with a hub at each end, and through these hubs the field-magnet is rigidly secured to the shaft and revolves with it. Openings are formed around the hubs for the admission of air in keeping the parts cool. The series of magnets is mounted upon the periphery of the section $d$, but insulated therefrom by a strip of insulating material, as at $f$. The cores of the magnets are secured to the section $d$ by properly-insulated screws or in any other suitable manner. These cores are of less length than the cylinder $d$, and the pole-pieces secured to the top of the cores are of the same length as the cylinder, and the coils of wire wound around the core are thus securely held in place. On the same shaft the revolving armature of an exciting-generator is mounted, of the Gramme type. The field-magnet of this generator is shown at E, and consists of three rings, $g\ h\ i$, placed side by side, with the coils of wire wound around the same, and the pole-pieces $k$. At opposite points on the periphery of the field-magnet lugs $l\ l$ project, one of which is shown in Fig. 2, and are adapted to bear against two pieces secured to the inside of the front ring-standard, B². Two similar lugs, $m\ m$, at right angles to the lugs $l\ l$, rest against the inner periphery of lugs $n\ n$, projecting from the front standard, and to these lugs $n\ n$ the projections $m\ m$ of the magnet-ring are secured, thus supporting the magnet rigidly in its proper position and preventing any displacement. The revolving armature of the exciting-generator is composed of sheet-metal strips, as shown in Fig. 7, arranged with their ends supported by rods passing through the same, the ends of the strips of adjoining sections being side by side, thus leaving air-spaces between the series of strips of each section.

The commutator of the exciting-generator is shown at F, and the brushes at G, of ordinary construction, and the coils of the field-magnets of the main generator are connected in the following manner with the exciting-machine: Commencing with the field-magnet of the exciting-generator, the current generated passes through the connection 1, insulated shank 2, and brushes G, the commutator F, and through the brushes G', ring 3, and wire 4 to the field-magnets of the main generator, thence through the return-wires 5 to the ring 6, brush 7, insulated sleeve 8, and back to the field of the exciting-generator through the wire 9. Between the exciting-machine and the field-magnet of the main generator I mount a fan, I, on the main shaft, to assist in creating a draft of air through the machine and thus keep the parts cool.

I now come to the description of the stationary armature surrounding the revolving field-magnets. This armature is composed of sections, and while I have shown eight in the drawings it will be understood that I do not limit myself in this respect. Each section is composed of a core and a series of coils surrounding the same. The core is composed of a series of pieces of sheet-iron, o o, which are laid side by side and held together by supporting-rods and by the coils passing around the same. The ends of the sheet-iron strips are concave, or grooved so as to adapt them to fit the periphery of the supporting-rods K, which extend between the ring-standards B and B' and support the sections of the armature. These rods are covered with or composed of insulating material, and thus each section is insulated from the other. At each end of the core the sheet-iron pieces are more firmly held to the insulated rods by the brackets p, which have a semi-curved arm adapted to the curve of the rods and an angular piece adapted to be secured to the rod, as shown in Fig. 4, and intermediate supports are provided, as shown at q, consisting of a bracket having a curved portion adapted to the rods, with an inwardly-projecting part, 10, for attachment to one of the sheet-metal pieces and the angle-plates 11, above and below, which aid in keeping the wires of adjoining sections apart. In order to prevent the wires of adjoining coils from being displaced I provide the lugs r, adapted to be secured at intervals to the sheet-metal sections with bearing-places one upon each side parallel to each other, but some distance apart, thus keeping adjoining coils from displacement. The coils are wound, as shown in Fig. 4, with insulating material between them and the metal core.

The manner of winding the coils upon the armature is shown in Figs. 5 and 6. My object in this is to produce separate circuits from each section of the armature. The number of coils on every section is even. They are connected in pairs on every section; but the connected coils of each section are wound one in one direction and one in the opposite direction, and throughout the whole of any circuit the immediate connection is between coils wound reversely to each other. Alternating with the coils of any one circuit wound as above described are placed the coils of another similar circuit wound in the same way, so that in the two circuits there are pairs side by side, both wound in one direction, alternating with other pairs, also side by side, both wound in opposite directions; but each independent circuit is composed of coils which alternate with those of the other circuit in position, but with each other in direction of winding. The sections are preferably wound so as to bring the terminals of each circuit at the greatest distance apart, thus keeping the terminals of each circuit independent of the terminals of the other circuits and preventing confusion of the wires, which would be liable to occur were all the terminals brought out at one point.

Beginning with the terminal 1 in Fig. 6, the coil is made in one direction, with the adjoining coil, 2, wound in the same direction. The next coil, 3, is wound in a direction reverse from coils 1 and 2, and is connected with coil 1. The next coil, 4, of the section is wound in the same direction as coil 3, and is connected with coil 2. The other sections are wound in precisely the same manner, and are connected with the coils of the adjoining sections, Fig. 5, showing the alternate coils of the armature-core connected to form one circuit, the spaces between the coils in practice being filled by the coils forming the other circuit and arranged upon the armature after the order shown in the section of the armature-core in Fig. 6.

It will thus be seen that every section of the armature-core contains an even number of coils, each pair in order being wound in one direction, but connected alternately, the connections thus being made with coils wound in reverse directions.

I have shown in Fig. 5 the coils arranged for a single circuit, and it will be understood that when the coils are wound in the intervening spaces shown in that figure two independent circuits will be formed. I may, however, increase the number of circuits to four by dividing the jumper at $s^t$, Fig. 5, which will thus give four circuits to the core instead of two, and of course this number may be increased by dividing the coils of the sections into a greater number of series and increasing the number of terminals in a corresponding manner; also, the number of coils of the sections may be increased, and this will also increase the capacity of the machine as to number of circuits.

I claim as my invention—

1. In a dynamo-electric machine, an armature composed of insulated sections and wound with coils forming a circuit, of which coils a pair is placed on each section, and the coils of the circuit alternate in direction of winding, substantially as described.

2. In a dynamo-electric machine, an armature composed of insulated sections and wound with coils forming a circuit, of which coils a pair is placed on each section, and the coils of the circuit alternate in direction of winding, in combination with another similar circuit, the coils of which alternate in position with those of the first circuit, substantially as described.

3. In a dynamo-machine, a stationary sectional armature, the sections being insulated from each other and provided with coils, the said coils being arranged in independent series, each series comprising alternate coils, substantially as described.

4. In a dynamo-electric machine, a stationary armature made up of core-segments and insulated rods between the segments, said rods being fixed in the ring-standards and supporting the armature, substantially as described.

5. In a dynamo-electric machine, a stationary armature made up of core-segments, each segment consisting of curved pieces of sheet metal with coils wound thereon, the coils being divided by angular pieces $r$, set into the segments, but insulated from the metal thereof, the said angular pieces projecting above and below the segments, substantially as described.

6. In a dynamo-electric machine, a stationary armature made of curved core-segments grooved upon their sides adapted to insulating supporting-rods, in combination with flanged blocks curved to conform to the supporting-rods and adapted to support the wires of the outer coils, substantially as described.

7. In a dynamo-machine, a stationary armature composed of curved core-segments grooved upon their sides adapted to insulating supporting-rods, combined with end lugs having a curved portion adapted to the rods and an angular portion in connection with the sections of the armature-core, substantially as described.

8. In a dynamo-machine, in combination, an exciting-generator having a stationary field-magnet, the said magnet being provided with projecting bearing and holding lugs on its periphery adapted to corresponding lugs on the frame, whereby the said field-magnet is held rigidly in place, substantially as described.

In testimony whereof I have signed my name to this specification in the presence of two subscribing witnesses.

CHAS. HEISLER.

Witnesses:
J. H. ROSENBAUM,
F. L. MIDDLETON.